US007685573B2

(12) United States Patent
Kang et al.

(10) Patent No.: US 7,685,573 B2
(45) Date of Patent: Mar. 23, 2010

(54) FLEXIBLE ERROR TRACE MECHANISM

(75) Inventors: Amy H. Kang, Mountain View, CA (US); Joseph F. Di Pol, Sunnyvale, CA (US); Linda K. Schneider, San Jose, CA (US); Christopher S. Kasso, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1004 days.

(21) Appl. No.: 10/651,328

(22) Filed: Aug. 28, 2003

(65) Prior Publication Data

US 2005/0028145 A1 Feb. 3, 2005

Related U.S. Application Data

(60) Provisional application No. 60/491,381, filed on Jul. 31, 2003.

(51) Int. Cl.
*G06F 9/44* (2006.01)
(52) U.S. Cl. ..................................................... 717/128
(58) Field of Classification Search ........................ None
See application file for complete search history.

(56) References Cited

U.S. PATENT DOCUMENTS

| 5,862,316 | A  | * | 1/1999  | Hagersten et al. | ........... 714/15  |
| 6,061,518 | A  | * | 5/2000  | Hoffman          | ........... 717/124 |
| 6,466,898 | B1 | * | 10/2002 | Chan             | ........... 703/17  |
| 6,611,844 | B1 | * | 8/2003  | Saulpaugh et al. | ........... 707/103 R|
| 6,901,539 | B2 | * | 5/2005  | Achtelstetter    | ........... 714/44  |
| 6,952,825 | B1 | * | 10/2005 | Cockx et al.     | ........... 718/102 |
| 7,017,077 | B2 | * | 3/2006  | Lowen et al.     | ........... 714/20  |
| 7,096,339 | B2 | * | 8/2006  | Nelson           | ........... 711/170 |
| 7,111,294 | B2 | * | 9/2006  | Steensgaard      | ........... 718/100 |
| 2003/0131282 | A1 | * | 7/2003 | Lowen et al.    | ........... 714/20  |
| 2004/0010703 | A1 | * | 1/2004 | Kouznetsov et al.| ........... 713/200 |
| 2004/0111696 | A1 | * | 6/2004 | Soroker et al.  | ........... 717/101 |
| 2004/0153878 | A1 | * | 8/2004 | Bromwich et al. | ........... 714/48  |
| 2005/0160431 | A1 | * | 7/2005 | Srivastava et al.| ........... 719/313 |

OTHER PUBLICATIONS

"The Error Handling Interface(H5E)", http://hdf.ncsa.uiuc.edu/HDF5/doc/Errors.html, printed on Nov. 30, 2006.*

(Continued)

*Primary Examiner*—Philip R. Wang
(74) *Attorney, Agent, or Firm*—Robert C. Kowert; Meyertons, Hood, Kivlin, Kowert & Goetzel, P.C.

(57) ABSTRACT

For a flexible error trace mechanism, embodiments may be implemented for C/C++ interface libraries, or in programs written in C/C++ or other programming languages. In one embodiment, when an error occurs in a function call, a trace element may be recorded that may include the source file name, function name, line number and other information that may be used to identify the error. In one embodiment, the library function may call a plurality of library functions in a function call stack. For each of the plurality of library functions, if the library function generates an error, an error trace element may be added to the error trace. After completion of the library function, the program may obtain the error trace for the library function. The error(s), if any, may be debugged using the information in the obtained error trace.

36 Claims, 4 Drawing Sheets

OTHER PUBLICATIONS

"Debugging HDF5 Applications", http://hdf.ncsa.uiuc.edu/HDF5/doc/Debugging.html, printed on Nov. 30, 2006.*

"H5E: Error Interface", Feb. 1, 2002, http://web.archive.org/web/20021220022628/http://hdf.ncsa.uiuc.edu/HDF5/doc/RM_H5E.html, retrived on Oct. 31, 2007.*

Jesse Liberty, "Make the Transition from Traditional Visual Basic Error Handling to the Object-Oriented Model in .NET," http://msdn.microsoft.com/msdnmag/issues/02/11/NETExceptions/, Nov. 2002, (9 pages).

Budlong, "Logging and Tracing in C++ Simplified," Aug. 2001, 2 pages.

Java Tech, Chapter 2: Java: Advanced, "Debugging Java," Oct. 15, 2005, 4 pages.

* cited by examiner

FLEXIBLE ERROR TRACE MECHANISM

PRIORITY INFORMATION

This application claims the benefit of U.S. Provisional Application No. 60/491,381, filed Jul. 31, 2003.

BACKGROUND OF THE INVENTION

1. Field of the Invention

This invention relates to computer software, and more particularly to error detection in code.

2. Description of the Related Art

Being able to trace an error when it occurs in a program may be as important as error handling itself in software development. With C/C++ programs or libraries, what is often seen is that a function returns an error status (e.g. an error code) that may tell little or nothing about where (i.e. the frame in the call stack) the error occurred. Lacking this information may make debugging software and/or identifying the root cause of an error time consuming and difficult. This may be especially true for errors that are difficult to reproduce. Often, C/C++ programs rely on debugging tools to trace errors. These debugging tools may require special debug build libraries. In production, typically only optimized libraries are deployed.

The standard C++ language has Exception classes for error handling that may be used to provide more information for tracking error conditions. Modern high-level languages, e.g. the Java programming language and Microsoft Visual Basic NET, may provide APIs to get the stack trace for exceptions.

SUMMARY

Embodiments of a flexible error trace mechanism are described. Embodiments may be implemented, for example, for C/C++ interface libraries, but embodiments may also be implemented in other programming languages. Embodiments provide a flexible error trace mechanism for C/C++ interface libraries at runtime. Embodiments provide a flexible error trace mechanism for C/C++ libraries or a library that provides C/C++ interfaces. Embodiments may also be used in programs written in other programming languages. Note that C/C++, when used herein, means either the C programming language, the C++ programming language, or both In one embodiment, when an error occurs in a function call, thread private data may be used to record a trace element. A trace element for a function may include or indicate one or more of, but is not limited to, the source file name, function name, line number, product name, and possibly other information that may be used to identify the error; for example, a low-level system call error number.

A program may call a library function of a library via an API to the library. In one embodiment, the library is a C/C++ interface library. If the library function generates one or more errors, an error trace element may be added to an error trace structure for each error generated. In one embodiment, each error trace element includes information describing a particular error generated during execution of the library function. The library function may complete and return to the calling program. After completion of the library function, if the library function generated an error, the program may obtain the error trace for the library function, for example by calling a library function configured to return the error trace.

In one embodiment, calling the library function may result in the call of a plurality of library functions in a function call stack. For each of the plurality of library functions, if the library function generates an error, an error trace element may be added to the error trace.

The error(s), if any, may be debugged using the information in the obtained error trace, if desired. In one embodiment, each error trace element indicates one or more of a location where the particular error of the error trace element occurred, an error type of the particular error, and what the particular error is. In one embodiment, debugging may include determining from the error trace element one or more of a location where the particular error of the error trace element occurred, an error type of the particular error, and what the particular error is.

Figure 1:
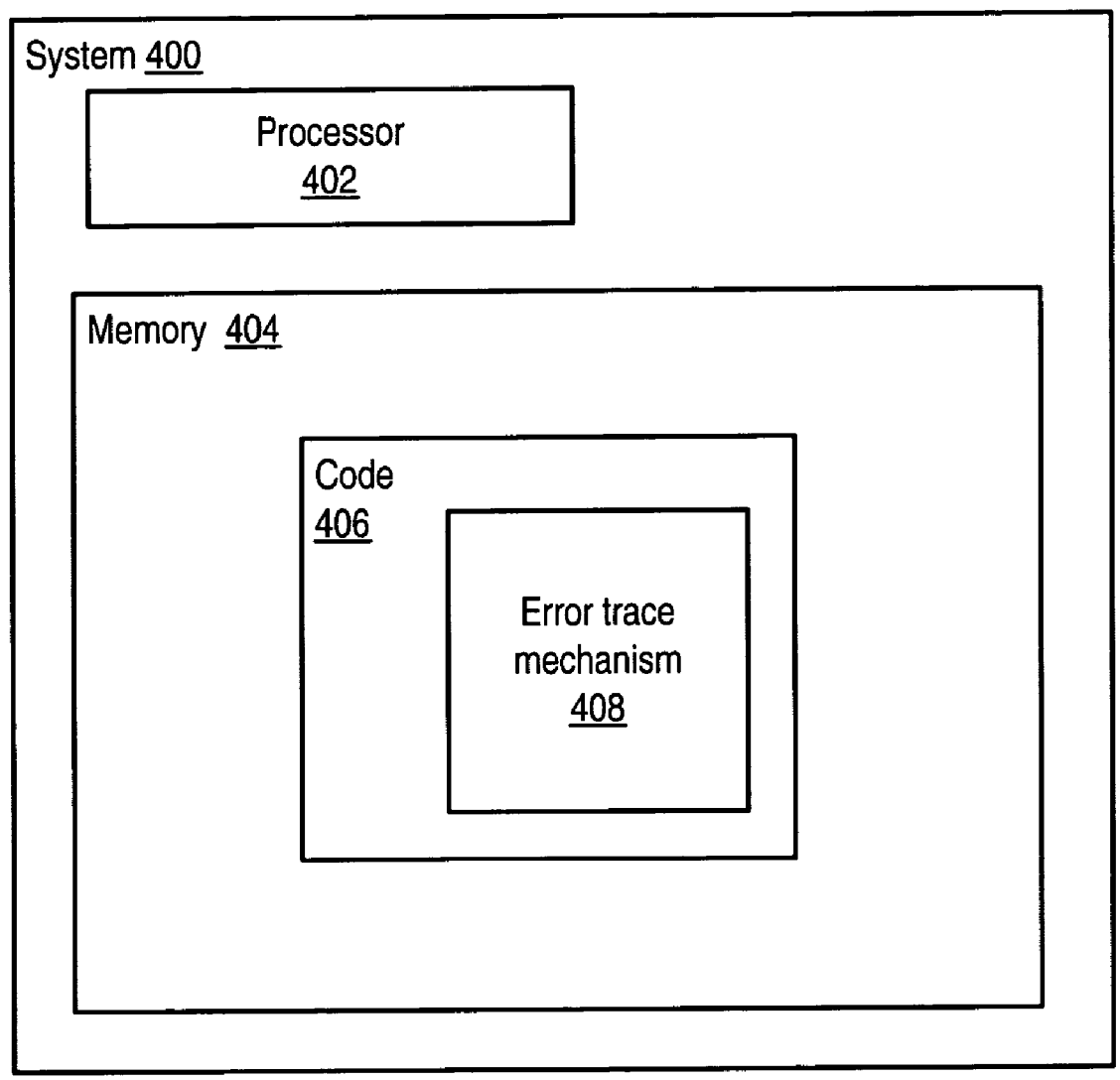
FIG. 1 illustrates a system implementing an error trace mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a flexible error trace mechanism are described. Embodiments may be implemented, for example, for C/C++ interface libraries, but embodiments may also be implemented in other programming languages. Embodiments provide a flexible error trace mechanism for C/C++ interface libraries at runtime. Embodiments provide a flexible error trace mechanism for C/C++ libraries or a library that provides C/C++ interfaces. Embodiments may also be used in programs written in other programming languages. Note that C/C++, when used herein, means either the C programming language, the C++ programming language, or both Embodiments may be used in single-threaded or multi-threaded programs. A thread may be defined as a sequential execution stream. There may be one or more threads per address space. Programs may use multi-threads to accomplish the performance of several tasks concurrently. In one embodiment, when an error occurs in a function call, thread private data may be used to record an error trace element. Note that, in other embodiments, the error trace elements may be stored in other locations than thread private data. In one embodiment, an error trace may be viewed as a location history that indicates one or more locations in potentially difference pieces of code and that defines the path the code took to generate this particular error.

An error trace element for a function may include or indicate one or more of, but is not limited to, the source file name, function name, line number, error type, and possibly other information that may be used to identify the error; for example, a low-level system call error number. In one embodiment, the error trace element may include or indicate a product name. The product name may be useful in layered software to determine which product the error occurred in. In one embodiment, product name information may be included in or indicated by the error type. For example, an 'nspr' error type used in Sun One Message Queue (MQ) may indicate the error occurred in an NSPR library. In this example, an MQ application calls API function in the MQ C-API library and the functions in the MQ C-API library in turn calls functions in the NSPR library. Note that error type may have other meaning in other implementations.

In one embodiment, error trace statements may be macros inserted into the source code so that the entire error trace in a library may be easily reduced to no-ops at compile time. In one embodiment, error trace statements may be defined with different debug levels so that an error trace in a debug build may have more function calls recorded for a call path than in an optimized build. In one embodiment, the library may provide a function to retrieve the error trace for the calling thread when the last library function call fails (or, in one embodiment, even if it doesn't fail). In one embodiment, the library implementer may decide where or how much tracing in a failed call path to record; that is, not every function call in a call path may need to be recorded.

FIG. 1 illustrates a system implementing an error trace mechanism according to one embodiment. System 400 may be any of various types of devices, including, but not limited to, a personal computer system, desktop computer, laptop or notebook computer, mainframe computer system, workstation, network computer, or other suitable device. System 400 may include at least one processor 402. The processor 402 may be coupled to a memory 404. Memory 404 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 400 may couple over a network to one or more other devices via one or more wired or wireless network interfaces.

System 400 may include, in memory 404, code 406 implementing an embodiment of an error trace mechanism 408. Error trace mechanism 408 may provide flexible error tracing for code 406 at runtime. Code 406 may be any type of program, program component, module, application, etc. In one embodiment, code 406 may be implemented in the C/C++ programming language. In other embodiments, code 406 may be implemented in other programming languages. In one embodiment, code 406 may, for example, include a C/C++ interface library that provides the functionality of the error trace mechanism 408 to the code 406. Embodiments may also be implemented in interface libraries of other programming languages. In one embodiment, error trace mechanism 408 may be implemented directly in a program or program component, function, module, application, etc., rather than being included as part of an interface library.

Figure 2:
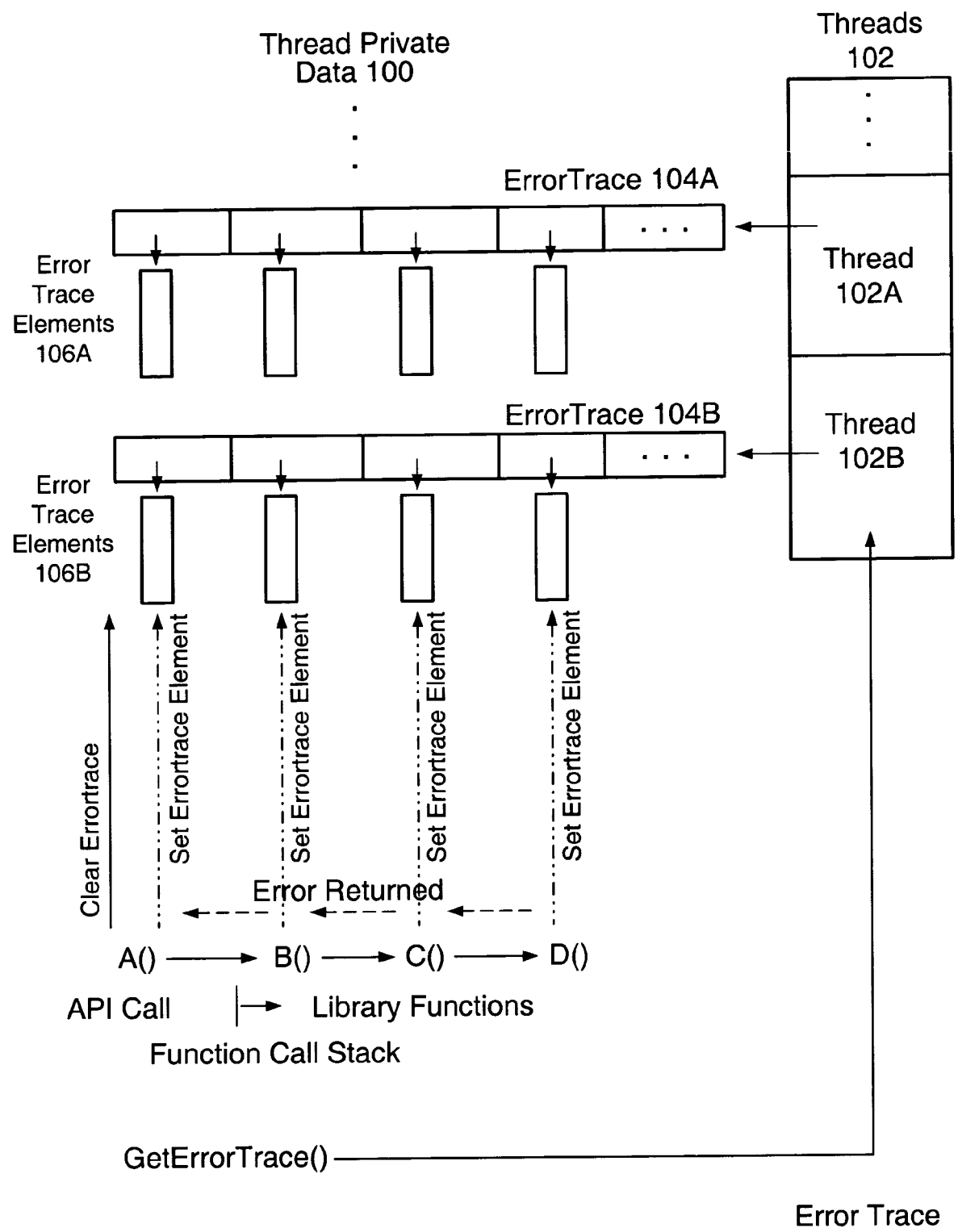
FIG. 2 illustrates the operation of the flexible error trace mechanism according to one embodiment.

FIG. 2 illustrates the operation of the flexible error trace mechanism according to one embodiment. One or more threads 102 may be executing within a program. Each thread private data 100 is a storage area (memory) specific to a particular thread. Each thread may store and access data in its associated thread private data 100 for the thread. In one embodiment, when error traces are stored using thread private data, all error trace elements generated for a particular thread are recorded in the thread's private data area. Thus, each thread private data 100 may store error traces 104, if any, for its associated thread. Each error trace 104 may include one or more elements 106. If no error has been encountered in a thread, or if the error trace has been cleared (e.g. by a call to ClearErrorTrace( )), then an error trace 104 may be empty or NULL.

In the function call stack, an API call to a function (A( )) may be made, for example by a function in user code. From that API call, a series of library functions may be called (e.g. B( ), C( ) and D( )) in the thread. If one or more of the function calls fails, then an error trace element may be written to the error trace 104 for the thread, for example through the failing function calling a SetErrorTraceElement( ) function of the library upon detecting the error. In one embodiment, an error trace 104 may then be obtained by the calling function, e.g. a function in user code, for example by calling a GetErrorTrace( ) function of the library. In one embodiment, the called API function (e.g. function A( )) may return an error code. The returned error code may be checked and, if the error code indicates that the called function (or any functions in the function call stack) failed, then the calling function may obtain the error trace 104 (e.g. by calling a GetErrorTrace( ) function or its equivalent). In another embodiment, an error trace 104 may be returned by the called API function, in this example function A( ). The error trace 104 may include one or more elements added to the error trace 104 by called library functions of the function call stack that encountered errors. If no functions in the function call stack encountered an error, then the error trace 104, if obtained, may indicate that no functions failed (e.g. via the array of trace elements in error trace 104 being NULL). The error trace 104 may then be evaluated, displayed, or otherwise used for debugging purposes, and, for example, may be used to determine one or more of, but not limited to, where (e.g. which method or function, file, and/or line number) an error or errors occurred, the error type of error(s) that occurred, and what the error(s) was (e.g. via error codes).

There are different ways in which multiple functions may be called in an error trace. For example, a. function A( ) may get called, and A( ) in turn calls functions x( ), y( ) and z( ). If x( ), y( ) or z( ) fails, A( ) may record an error trace element for each of the functions. Alternatively, x( ), for example, may record a error trace element, or both A( ) and x( ) may record an error trace element. This may be useful in identifying an error location when A( ) may call x( ) in multiple places in A( ), and A( ) has different execution branches depending on some condition variable. As another example, function A( ) may get called, and A( ) calls x( ), and x( ) in turn calls y( ), and y( ) in turn calls z( ). In this example, any of these functions may record an error trace element.

Note that, in one embodiment, a program may include two or more threads running simultaneously (e.g. threads 102A and 102B), and each thread may be recording some or all errors that occur in a thread-specific error trace 104.

The following is an exemplary API that provides an embodiment of the error trace mechanism, and includes a library code and user code example of using the error trace mechanism provided by the API. This example is from a message queue (MQ) API (e.g. Sun One Message Queue (MQ)), and is written in the C/C++ programming language, and is not intended to be limiting. Embodiments of the error trace mechanism may be similarly implemented in other APIs, or in other code structures. The following is an exemplary API definition (header file) that includes the error trace mechanism:

```
#ifndef ERRORTRACE_H
#define ERRORTRACE_H
ifdef __cplusplus
extern "C" {
#endif /* __cplusplus */
struct ErrorTrace {
    MQBool usable;
    MQUint32 num_elements;
    MQUint32 num_allocated;
    char **trace;
};
/* get the errorTrace */
MQStatus getErrorTrace (ErrorTrace ** trace);
/* set an element in the ErrorTrace structure. This adds an element to
char **trace, an array of error trace elements where each error trace
element is represented as a string, in the ErrorTrace. Note that
num_elements is also incremented */
MQStatus setErrorTraceElement   ( const char * method,
                                  const char * file,
                                  MQInt32 lineNumber,
                                  const char * errorType,
                                  MQUint32 errorCode);
/* clear ErrorTrace; if 'all' is true, clear thread private data as well */
MQStatus clearErrorTrace (MQBool all);
ifdef __cplusplus
}
#endif /* __cplusplus */
#endif /* ERRORTRACE_H */
```

In one embodiment, getErrorTrace( ) returns the current thread's current error trace in string format as defined below (or NULL if no error trace is available). In one embodiment, a C/C++API internal function may decide when or whether to record an error trace element in the error trace in case of an error. In one embodiment, error trace is stored as thread private data.

In one embodiment, the format of an error trace string may be:

<method name>:<file name>:<line number>:<error type>:<error code>:<error string> where:
<method name> is the name of the method in which the error trace element was added.
<file name> is the name of the file which contains the source for the indicated method.
<line number> is the line number where the particular error occurred.
<error type> is a type for the error. In one embodiment, error type may indicate an application, library, or other module in which the error occurred. In one embodiment, product name information may be included in or indicated by the error type, e.g. mq, nspr, nss, or os. Note that error type may have other meanings in other implementations.
<error code> is a code that indicates the specific error that the error trace is reporting.
<error string> is an (optional) string that may indicate other information about the error.

Note that other embodiments may use other formats for the error trace string.

In one embodiment, the caller may be responsible for freeing the returned string (e.g. an MQstring) by calling a function to free the string (e.g. MQFreestring( )). In one embodiment, the current thread's error trace may be automatically cleared on the next C-API method call, and may also be cleared by other function calls (e.g. in an MQCloseConnection( ) call). In one embodiment, the error trace string may be private.

The following is an API library code example function according to one embodiment:

```
Error A( )
{
    static const char FUNC_NAME[ ] = "A";
    Error errorCode;
    CLEAR_ERROR_TRACE(PR_FALSE);
    errorCode = b( );
    .....
    if (errorCode != SUCCESS) {
        MQ_ERROR_TRACE(FUNC_NAME, errorCode);
    }
    .....
}
```

The following is a user code example according to one embodiment:

```
.....
/* call the API function A( ) */
Error errorCode = A( );
/* check the return status */
if (errorCode != SUCCESS) {
    .....
    /* get the error trace */
    ErrorTrace errorTrace = getErrorTrace( );
    .....
    /* process as needed according to the returned errorTrace */
    .....
}
.....
```

The following is an example of an error trace output that may be obtained when an exemplary API call (in this example, an API function MQCreateConnection( )) fails:

```
connect:../ ../ ../ ../src/share/cclient/io/TCPSocket.cpp:173:mq:2103
connect:../ ../ ../ ../src/share/cclient/io/TCPSocket.cpp:195:mq:2103
readBrokerPorts:../ ../ ../ ../src/share/cclient/client/PortMapperClient.cpp:48:mq:2103
connect:../ ../ ../ ../src/share/cclient/client/protocol/TCPProtocolHandler.cpp:111:
connectToBroker:../ ../ ../ ../src/share/cclient/client/Connection.cpp:416:mq:2103
openConnection:../ ../ ../ ../src/share/cclient/client/Connection.cpp:247:mq:1900
MQCreateConnection:../ ../ ../ ../src/share/cclient/cshim/iMQConnectoinShim.cpp:120:mq:
```

Figure 3:
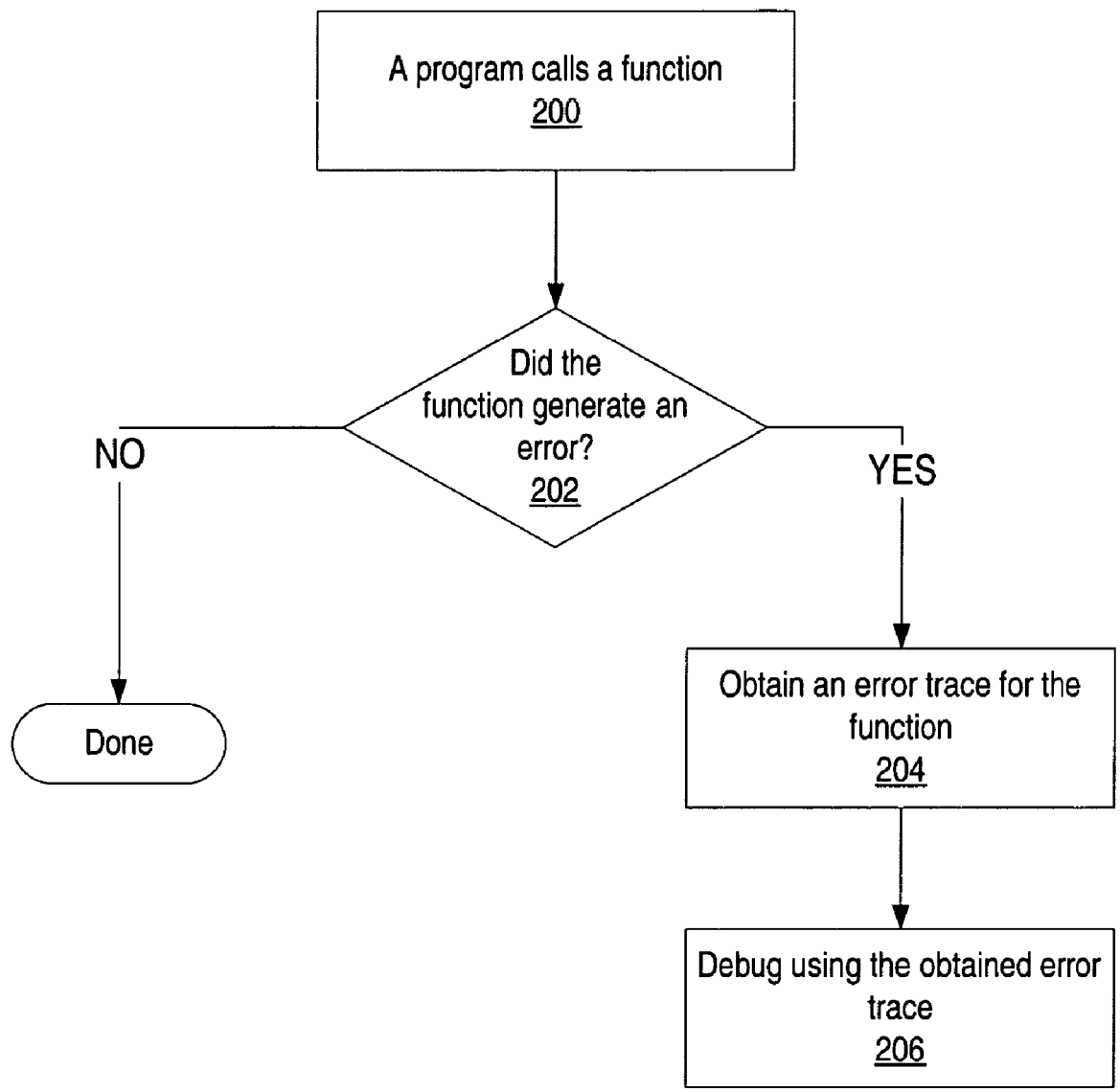
FIG. 3 is a flowchart of a method for flexible error tracing according to one embodiment.

FIG. 3 is a flowchart of a method for flexible error tracing according to one embodiment. As indicated at 200, a program may call a function that implements an embodiment of the error trace mechanism as described herein. In one embodiment, the function may be a function of a library called via an API to the library. In one embodiment, the library may be a C/C++ interface library.

As indicated at 202, after the function completes, the program may determine if the function generated an error. As indicated at 204, if the function generated an error, the program may obtain an error trace for the function. In one embodiment, the obtained error trace may include one or more error trace elements, and each error trace element includes information describing a particular error generated during execution of the function.

In one embodiment, the function may call a plurality of functions in a function call stack. For each of the plurality of functions, if the particular function generates an error, an error trace element may be added to the error trace.

As indicated at 206, the error(s) may be debugged using the information in the obtained error trace, if desired. In one embodiment, each error trace element indicates one or more of a location where the particular error of the error trace element occurred, an error type of the particular error, and what the particular error is. In one embodiment, the location of the particular error may include one or more of a function name, a source file name, and a line number where the particular error occurred. In one embodiment, debugging may include determining from the error trace element one or more of a location where the particular error of the error trace element occurred, an error type of the particular error, and what the particular error is.

Figure 4:
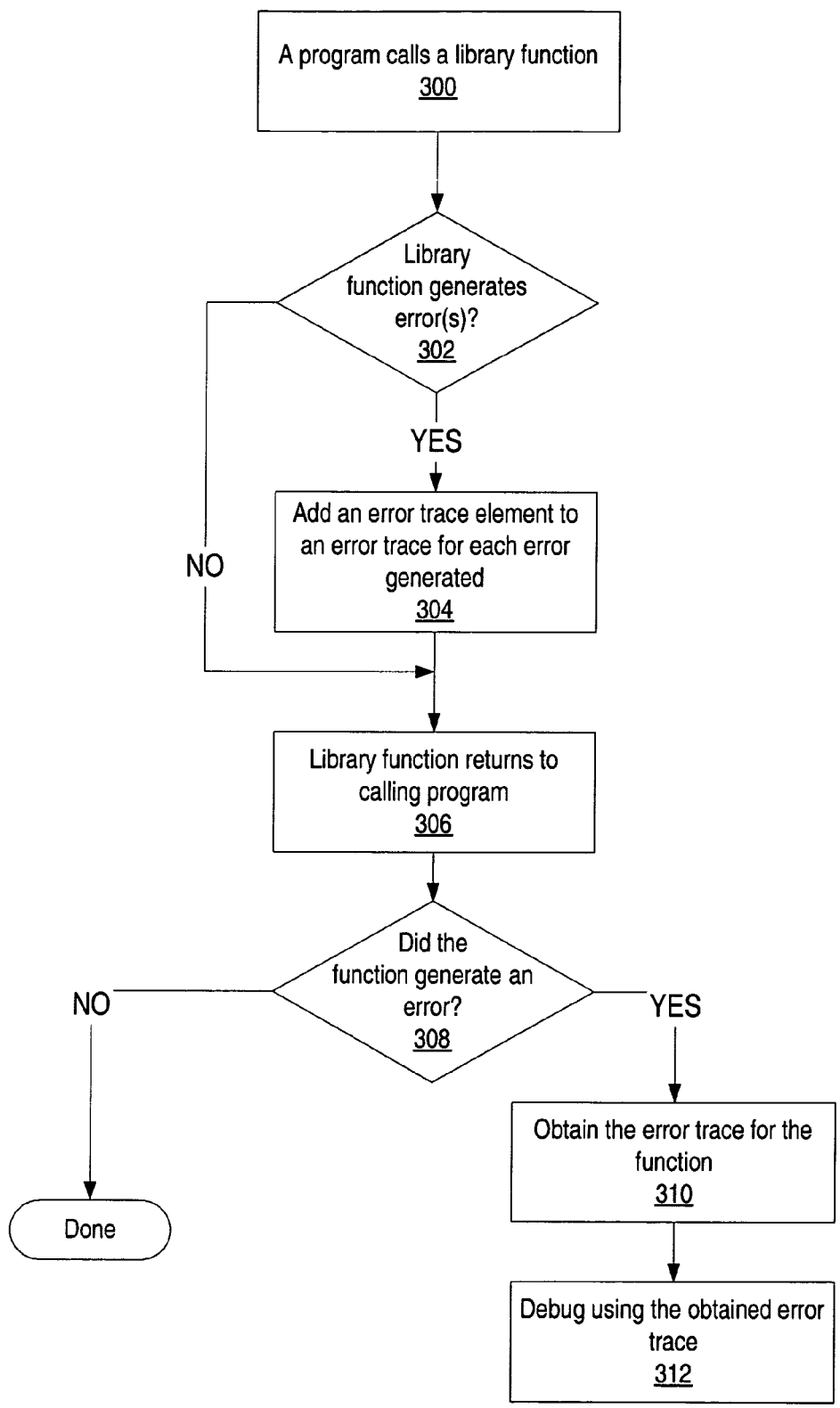
FIG. 4 is a flowchart of a method for flexible error tracing in a library according to one embodiment.

FIG. 4 is a flowchart of a method for flexible error tracing in a library according to one embodiment. In one embodiment, the library is a C/C++ interface library. As indicated at 300, a program may call a library function of a library via an API to the library. As indicated at 302, if the library function generates one or more errors, an error trace element may be added to an error trace for each error generated, as indicated at 304. In one embodiment, each error trace element includes information describing a particular error generated during execution of the library function. As indicated at 306, the library function may complete and return to the calling program. After completion of the library function, if the library function generated an error as indicated at 308, the program may obtain the error trace for the library function as indicated at 310, for example by calling a GetErrorTrace( ) function of the library.

In one embodiment, calling the library function may result in the call of a plurality of library functions in a function call stack. For each of the plurality of library functions, if the library function generates an error, an error trace element may be added to the error trace.

As indicated at 312, the error(s) may be debugged using the information in the obtained error trace, if desired. In one embodiment, each error trace element indicates one or more of a location where the particular error of the error trace element occurred, an error type of the particular error, and what the particular error is. In one embodiment, the location of the particular error may include one or more of a function name, a source file name, and a line number where the particular error occurred. In one embodiment, debugging may include determining from the error trace element one or more of a location where the particular error of the error trace element occurred, an error type of the particular error, and what the particular error is.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a processor; and
 a memory comprising program instructions, wherein the program instructions are executable by the processor to implement:
  in each of two or more threads of a multithreaded program, for each error generated by one or more functions executed in the thread, store an error trace element in thread private data of the respective thread, wherein the error trace element is stored by the thread to the respective thread private data in accordance with an application programming interface (API) to an error trace mechanism, and wherein the thread private data is a memory storage area of the multithreaded program accessible by the respective thread but not by others of the two or more threads; and
  in a function of the multithreaded program, obtain an error trace for each of the two or more threads of the multithreaded program, wherein an error trace for a thread is obtained from the respective thread in accordance with the API to the error trace mechanism;
 wherein each error trace includes one or more error trace elements from the thread private data of the respective thread, wherein each error trace element includes a plurality of fields describing a particular error generated during execution of the respective thread.

2. The system as recited in claim 1, wherein each error trace further includes a field indicating a count of the error trace elements in the error trace.

3. The system as recited in claim 1, wherein each error trace element indicates one or more of a location where the particular error of the error trace element occurred, an error type of the particular error, and what the particular error is.

4. The system as recited in claim 3, wherein the location of the particular error includes one or more of a function name, a source file name, and a line number where the particular error occurred.

5. The system as recited in claim 1, wherein the program is further configured to determine from each error trace element one or more of a location where the particular error of the error trace element occurred, an error type of the particular error, and what the particular error is.

6. The system as recited in claim 1, wherein the error trace mechanism is a C/C++ interface library.

7. A system, comprising:
a processor; and
a memory comprising program instructions, wherein the program instructions are executable by the processor to implement a library and a multithreaded program configured to call library functions of the library in accordance with an application programming interface (API) to the library;
wherein the library is configured to, for each of two or more threads of the multithreaded program, add an error trace element for each error generated on the thread by the library functions to an error trace in thread private data of the respective thread, wherein each error trace element includes information describing a particular error generated during execution of the corresponding thread, and wherein the thread private data is a memory storage area of the multithreaded program accessible by the respective thread but not by others of the two or more threads; and
wherein, after completion of a called library function, the multithreaded program is configured to obtain an error trace for a thread corresponding to the call of the library function, wherein the error trace for the thread is obtained in accordance with the API to the library.

8. The system as recited in claim 7, wherein the called library function is configured to call one or more other library functions in a function call stack, wherein each of the one or more other library functions is configured to, if the library function generates an error, add an error trace element to an error trace in thread private data of a thread corresponding to the function call stack.

9. The system as recited in claim 7, wherein the multithreaded program is further configured to determine from the error trace element one or more of a location where each error occurred, an error type of each error, and what each error is.

10. The system as recited in claim 7, wherein the library is a C/C++interface library.

11. A system, comprising:
a processor; and
a memory comprising program instructions, wherein the program instructions are executable by the processor to implement a library comprising one or more library functions and an application programming interface (API) to the library, wherein the API includes:
one or more function definitions configured for access of the one or more library functions by a multithreaded program; and
a function definition for a get error trace function configured for access by the multithreaded program to get error traces generated by the one or more library functions in two or more threads of the multithreaded program, wherein each error trace is stored in thread private data of the respective thread, and wherein the thread private data is a memory storage area of the multithreaded program accessible by the respective thread but not by others of the two or more threads;
wherein each error trace includes one or more error trace elements from the thread private data of the respective thread, wherein each error trace element includes a plurality of fields describing a particular error generated during execution of the respective thread.

12. The system as recited in claim 11, wherein one of the library functions is configured to call a plurality of other library functions in a function call stack, wherein each of the plurality of library functions is configured to, if the library function generates an error, add an error trace element to an error trace in thread private data of a thread corresponding to the function call stack.

13. The system as recited in claim 12, wherein the location of the particular error includes one or more of a function name, a source file name, and a line number where the particular error occurred.

14. The system as recited in claim 11, wherein the multithreaded program is configured to determine from each error trace element one or more of a location where the particular error of the error trace element occurred, an error type of the particular error, and what the particular error is.

15. The system as recited in claim 11, wherein the library is a C/C++interface library.

16. A system, comprising:
means for a plurality of functions in each of two or more function call stacks in a multithreaded program to generate information describing one or more errors generated by the plurality of functions;
means to store the generated information in thread private data of specific threads of two or more threads of the multithreaded program corresponding to the two or more function call stacks, wherein thread private data is a memory storage area of the multithreaded program accessible by a respective thread but not by others of the two or more threads;
means to obtain the generated information; and
means to determine from the obtained information one or more of a location where each error occurred, an error type of each error, and what the each error is.

17. The system as recited in claim 16, wherein the plurality of functions are functions of a library, further comprising means to call the plurality of functions from the multithreaded program.

18. The system as recited in claim 17, wherein the library is a C/C++interface library.

19. A method, comprising:
calling one or more functions in each of two or more threads of a multithreaded program;
in each of the two or more threads of the multithreaded program, for each error generated by the one or more functions called in the thread, storing an error trace element in thread private data of the respective thread, wherein the error trace element is stored by the thread to the respective thread private data in accordance with an application programming interface (API) to an error trace mechanism, and wherein the thread private data is a memory storage area of the multithreaded program accessible by the respective thread but not by others of the two or more threads; and
the program obtaining an error trace for each of the two or more threads of the multithreaded program, wherein an error trace for a thread is obtained from the respective thread in accordance with the API to the error trace mechanism;
wherein each error trace includes one or more error trace elements from the thread private data of the respective thread, wherein each error trace element includes a plurality of fields describing a particular error generated during execution of the respective thread.

20. The method as recited in claim 19, wherein each error trace element indicates one or more of a location where the particular error of the error trace element occurred, an error type of the particular error, and what the particular error is.

21. The method as recited in claim 20, wherein the location of the particular error includes one or more of a function name, a source file name, and a line number where the particular error occurred.

22. The method as recited in claim 19, further comprising determining from each error trace element one or more of a location where the particular error of the error trace element occurred, an error type of the particular error, and what the particular error is.

23. The method as recited in claim 19, wherein the error trace mechanism is a C/C++ interface library.

24. A method, comprising:
   a multithreaded program calling library functions of a library in accordance with an application programming interface (API) to the library;
   for each of two or more threads of the multithreaded program, adding an error trace element for each error generated on the thread by the library functions to an error trace in thread private data of the respective thread, wherein the thread private data is a memory storage area of the multithreaded program accessible by the respective thread but not by others of the two or more threads;
   after completion of a called library function, the multithreaded program obtaining an error trace for one of the two or more threads corresponding to the call of the library function, wherein the error trace for the thread is obtained in accordance with the API to the library;
   wherein each error trace element includes a plurality of fields describing a particular error generated during execution of the respective thread.

25. The method as recited in claim 24, further comprising:
   the called library function calling one or more other library functions in a function call stack; and
   for each of the one or more other library functions, if the library function generates an error, adding an error trace element to an error trace in thread private data of a thread corresponding to the function call stack.

26. The method as recited in claim 24, further comprising determining from the error trace element one or more of a location where each error occurred, an error type of each error, and what each error is.

27. The method as recited in claim 24, wherein the library is a C/C++ interface library.

28. A computer-accessible storage medium, comprising program instructions, wherein the program instructions are computer-executable to implement:
   calling one or more functions in each of two or more threads of a multithreaded program;
   in each of the two or more threads of the multithreaded program, for each error generated by the one or more functions called in the thread, storing an error trace element in thread private data of the respective thread, wherein the error trace element is stored by the thread to the respective thread private data in accordance with an application programming interface (API) to an error trace mechanism, and wherein the thread private data is a memory storage area of the multithreaded program accessible by the respective thread but not by others of the two or more threads; and
   the program obtaining an error trace for each of the two or more threads of the multithreaded program, wherein an error trace for a thread is obtained from the respective thread in accordance with the API to the error trace mechanism;
   wherein each error trace includes one or more error trace elements from the thread private data of the respective thread, wherein each error trace element includes a plurality of fields describing a particular error generated during execution of the respective thread.

29. The computer-accessible storage medium as recited in claim 28, wherein each error trace element indicates one or more of a location where the particular error of the error trace element occurred, an error type of the particular error, and what the particular error is.

30. The computer-accessible storage medium as recited in claim 29, wherein the location of the particular error includes one or more of a function name, a source file name, and a line number where the particular error occurred.

31. The computer-accessible storage medium as recited in claim 28, wherein the program instructions are further computer-executable to implement determining from each error trace element one or more of a location where the particular error of the error trace element occurred, an error type of the particular error, and what the particular error is.

32. The computer-accessible storage medium as recited in claim 28, wherein the error trace mechanism is a C/C++ interface library.

33. A computer-accessible storage medium, comprising program instructions, wherein the program instructions are computer-executable to implement:
   a multithreaded program calling library functions of a library in accordance with an application programming interface (API) to the library;
   for each of two or more threads of the multithreaded program, adding an error trace element for each error generated on the thread by the library functions to an error trace in thread private data of the respective thread, wherein the thread private data is a memory storage area of the multithreaded program accessible by the respective thread but not by others of the two or more threads;
   after completion of a called library function, the multithreaded program obtaining an error trace for one of the two or more threads corresponding to the call of the library function, wherein the error trace for the thread is obtained in accordance with the API to the library;
   wherein each error trace element includes a plurality of fields describing a particular error generated during execution of the respective thread.

34. The computer-accessible storage medium as recited in claim 33, wherein the program instructions are further computer-executable to implement:
   the called library function calling one or more other library functions in a function call stack; and
   for each of the one or more other library functions, if the library function generates an error, adding an error trace element to an error trace in thread private data of a thread corresponding to the function call stack.

35. The computer-accessible storage medium as recited in claim 33, wherein the program instructions are further computer-executable to implement determining from the error trace element one or more of a location where each error occurred, an error type of each error, and what each error is.

36. The computer-accessible storage medium as recited in claim 33, wherein the library is a C/C++ interface library.

* * * * *